United States Patent
Chen et al.

(10) Patent No.: US 11,736,285 B2
(45) Date of Patent: Aug. 22, 2023

(54) METHOD FOR CONTROLLING DEVICE ACTIVATION AND ASSOCIATED ELECTRONIC DEVICE

(71) Applicant: PUFsecurity Corporation, Hsinchu County (TW)

(72) Inventors: Yung-Chih Chen, Hsinchu County (TW); Chia-Cho Wu, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 110 days.

(21) Appl. No.: 17/541,260

(22) Filed: Dec. 3, 2021

(65) Prior Publication Data
US 2022/0191033 A1    Jun. 16, 2022

Related U.S. Application Data

(60) Provisional application No. 63/124,085, filed on Dec. 11, 2020.

(51) Int. Cl.
*H04L 9/32* (2006.01)
*H04L 9/08* (2006.01)
*G06F 9/4401* (2018.01)
*G06F 21/57* (2013.01)

(52) U.S. Cl.
CPC .......... *H04L 9/0866* (2013.01); *G06F 9/4401* (2013.01); *G06F 21/575* (2013.01); *H04L 9/085* (2013.01); *H04L 9/0894* (2013.01); *H04L 9/3228* (2013.01); *H04L 9/3234* (2013.01);
(Continued)

(58) Field of Classification Search
CPC ..... H04L 9/0866; H04L 9/085; H04L 9/0894; H04L 9/3228; H04L 9/3234; H04L 9/3278; H04L 9/0869; H04L 9/3247; G06F 9/4401; G06F 21/575; G06F 2221/034; G06F 7/588; G06F 21/10; G06F 21/73; G09C 1/00
See application file for complete search history.

(56) References Cited

U.S. PATENT DOCUMENTS

| | | | |
|---|---|---|---|
| 9,467,430 B2 | 10/2016 | Smith | |
| 9,742,563 B2 | 8/2017 | Gotze | |

(Continued)

FOREIGN PATENT DOCUMENTS

| | | |
|---|---|---|
| CN | 104838385 A | 8/2015 |
| CN | 108604275 A | 9/2018 |
| TW | 202008205 A | 2/2020 |

*Primary Examiner* — Izunna Okeke
(74) *Attorney, Agent, or Firm* — Winston Hsu

(57) ABSTRACT

A method for controlling device activation and an associated electronic device are provided. The method includes: utilizing a static entropy source of the electronic device to provide a static entropy; utilizing a first message authentication code (MAC) operator of the electronic device to execute a predetermined algorithm for generating a reference code according to the static entropy and an embedded key of the electronic device; receiving an activation code from outside of the electronic device; utilizing a comparing circuit to compare the activation code with the reference code for generating a comparison result; and determining whether to activate at least one functional circuit of the electronic device according to the comparison result.

16 Claims, 8 Drawing Sheets

(52) U.S. Cl.
CPC ...... *H04L 9/3278* (2013.01); *G06F 2221/034* (2013.01)

(56) References Cited

U.S. PATENT DOCUMENTS

2010/0146261 A1* 6/2010 Talstra .................... G06F 21/10
 713/176
2014/0189890 A1* 7/2014 Koeberl ................... G09C 1/00
 726/34

* cited by examiner

METHOD FOR CONTROLLING DEVICE ACTIVATION AND ASSOCIATED ELECTRONIC DEVICE

CROSS REFERENCE TO RELATED APPLICATIONS

This application claims the benefit of U.S. provisional application No. 63/124,085, which was filed on Dec. 11, 2020, and is included herein by reference.

BACKGROUND OF THE INVENTION

1. Field of the Invention

The present invention is related to device activation, and more particularly, to a method for controlling device activation and an associated electronic device.

2. Description of the Prior Art

When an integrated circuit (IC) design house finishes the design of an IC, the IC will be manufactured by a third party such as a wafer foundry. Even though the IC design house may request the wafer foundry to manufacture only a certain number of ICs with respect to the design, the ICs may be overproduced in practice. Under some conditions, the overproduced ICs might be obtained by some people who are unauthorized by the IC design house. Thus, there is a need for a novel method and an associated electronic device, to prevent the unauthorized people from utilizing the overproduced ICs.

SUMMARY OF THE INVENTION

An objective of the present invention is to provide a method for controlling device activation and an associated electronic device, which can ensure that only authorized customers are able to activate the associated electronic device.

At least one embodiment of the present invention provides a method for controlling device activation. The method may comprise: utilizing a static entropy source of an electronic device to provide a static entropy; utilizing a first message authentication code (MAC) operator of the electronic device to execute a predetermined algorithm for generating a reference code according to the static entropy and an embedded key of the electronic device; receiving an activation code from outside of the electronic device; utilizing a comparing circuit to compare the activation code with the reference code for generating a comparison result; and determining whether to activate at least one functional circuit of the electronic device according to the comparison result.

At least one embodiment of the present invention further provides an electronic device. The electronic device may comprise at least one functional circuit, wherein the at least one functional circuit is configured to execute at least one predetermined function. In addition, the electronic device may further comprise an authentication circuit coupled to the at least one functional circuit, wherein the authentication circuit is configured to control activation of the at least one functional circuit. The authentication circuit may comprise a static entropy source, a first MAC operator and a comparing circuit. The static entropy source is configured to provide a static entropy. The first MAC operator is coupled to the static entropy source, and is configured to execute a predetermined algorithm for generating a reference code according to the static entropy and an embedded key of the electronic device. The comparing circuit is coupled to the first MAC operator, and is configured to compare an activation code from outside of the electronic device with the reference code for generating a comparison result. More particularly, the authentication circuit may determine whether to activate the at least one functional circuit according to the comparison result.

The embodiments of the present invention can ensure that only those knowing a correct value of the embedded key are able to generate the correct authentication code for activating the electronic device. In addition, as the static entropy is unique for each electronic device (i.e., different electronic device may have different static entropies), the activation code which needs to be generated based on the static entropy is dedicated for said each electronic device. For example, an activation code for a certain electronic device cannot be applied to another electronic device. Thus, the present invention can ensure that only authorized customers (e.g., those knowing the correct value of the embedded key) are able to activate the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
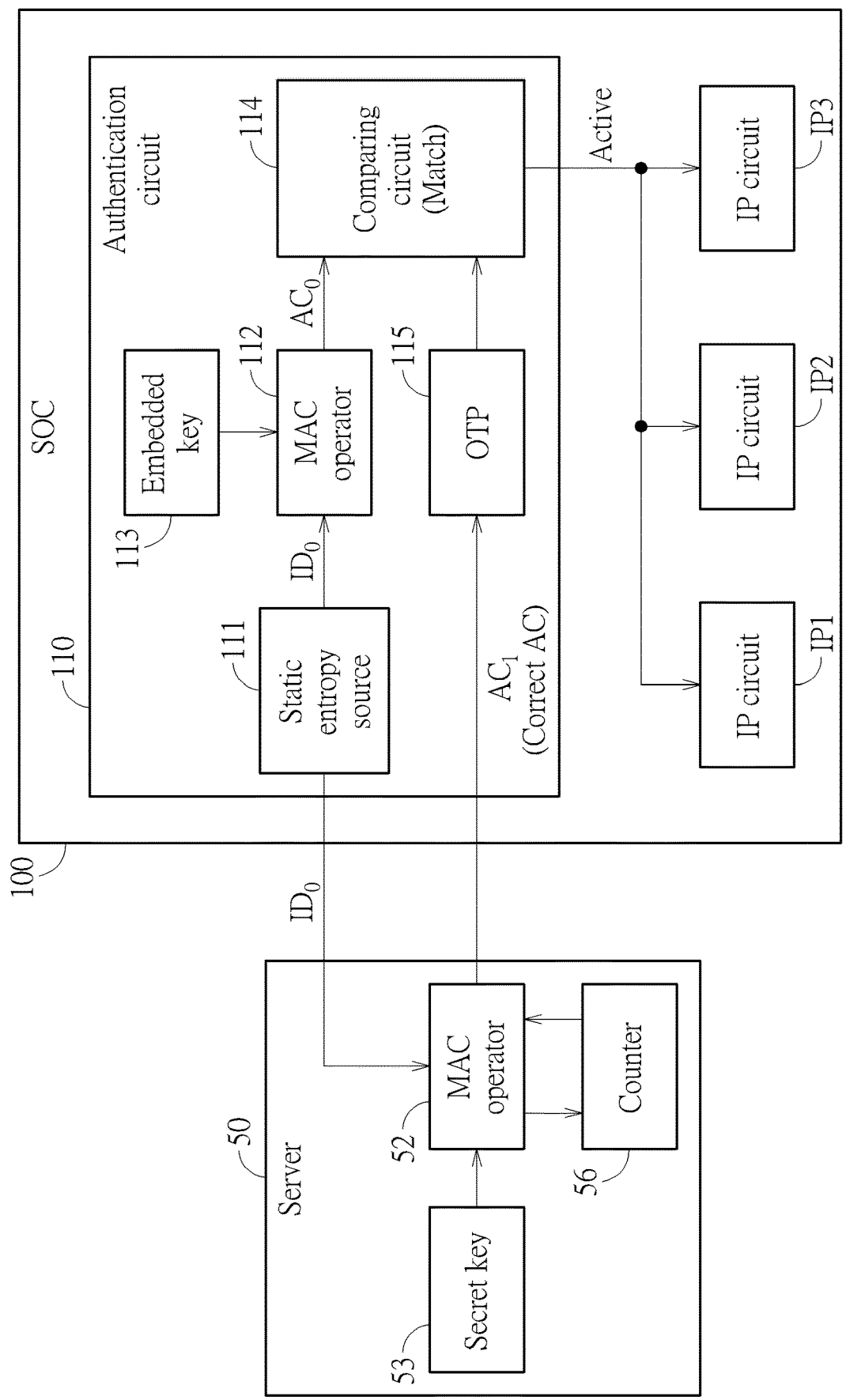
FIG. 1 is a diagram illustrating an electronic device coupled to an activating device according to an embodiment of the present invention.

FIG. 1 is a diagram illustrating an electronic device coupled to an activating device according to an embodiment of the present invention. In this embodiment, the electronic device may be a system on a chip (SOC) 100, and the activating device (such as a server 50 shown in FIG. 1) may be implemented as a dongle such as a Universal Serial Bus (USB) dongle, but the present invention is not limited thereto. As shown in FIG. 1, the SOC 100 may comprise at least one internal circuit such as functional circuits IP1, IP2 and IP3, where each of the functional circuits IP1, IP2 and IP3 is configured to execute at least one predetermined function such as operations of a function requested by customers. The SOC 100 may further comprise an authentication circuit 110 coupled to the functional circuits IP1, IP2 and IP3, and is configured to control activation of the functional circuits IP1, IP2 and IP3. In this embodiment, the authentication circuit 110 may comprise a static entropy source 111, a message authentication code (MAC) operator 112 (e.g., a MAC circuit) and a comparing circuit 114. The static entropy source 111 is configured to provide a static entropy $ID_0$, which may be regarded as an identifier of the SOC 100. The MAC operator 112 is coupled to the static entropy source 111, and is configured to execute a predetermined algorithm (e.g., executing a hash function) for generating a reference code $AC_0$ according to the static entropy $ID_0$ and an embedded key 113 of the SOC 100. For example, the MAC operator 112 may take the embedded key 113 as a secret key and take the static entropy $ID_0$ as a message to be authenticated in the hash function, for generating an authentication code as the reference code $AC_0$, but the present invention is not limited thereto. The comparing circuit 114 is coupled to the MAC operator 112, and is configured to compare an activation code $AC_1$ from outside of the SOC 100 with the reference code $AC_0$ for generating a comparison result. More particularly, the authentication circuit 110 may determine whether to activate the functional circuits IP1, IP2 and IP3 according to the comparison result. More particularly, when the comparison result indicates that the activation code $AC_1$ is identical to the reference code $AC_0$, which means the activation code $AC_1$ is a correct activation code (labeled "Correct AC" in FIG. 1 for better comprehension), the authentication circuit 110 may activate the functional circuits IP1, IP2 and IP3 (e.g., controlling states of the functional circuits IP1, IP2 and IP3 to be active). When the comparison result indicates that the activation code $AC_1$ is not identical to the reference code $AC_0$, which means the activation code $AC_1$ is not a correct activation code, the authentication circuit 110 may not activate the functional circuits IP1, IP2 and IP3.

In this embodiment, the SOC 100 receives the activation code $AC_1$ from the server 50. As shown in FIG. 1, the server 50 may comprise a MAC operator 52 and a counter 56 coupled to the MAC operator 52. The server 50 may receive the static entropy $ID_0$ from the static entropy source 111 of the SOC 100, and the MAC operator 52 is configured to execute the predetermined algorithm (e.g., executing the same hash function as the MAC operator 112) for generating the activation code $AC_1$ according to the static entropy $ID_0$ and a secret key 53. When the secret key 53 of the server 50 is identical to the embedded key 113 of the SOC 100, the comparison result may indicate that the activation code $AC_1$ is identical to the reference code $AC_0$ (labeled "Match" for better comprehension), and therefore the authentication circuit 110 may activate the functional circuits IP1, IP2 and IP3. In addition, the counter 56 is configured to generate a counting result for indicating how many activation codes have been generated by the MAC operator 52, and thereby monitors how many electronic devices have been activated by the server 50. For example, the counter 56 may generate an activation code count of multiple activation codes that have been generated by the MAC operator 52 to be the counting result.

Figure 2:
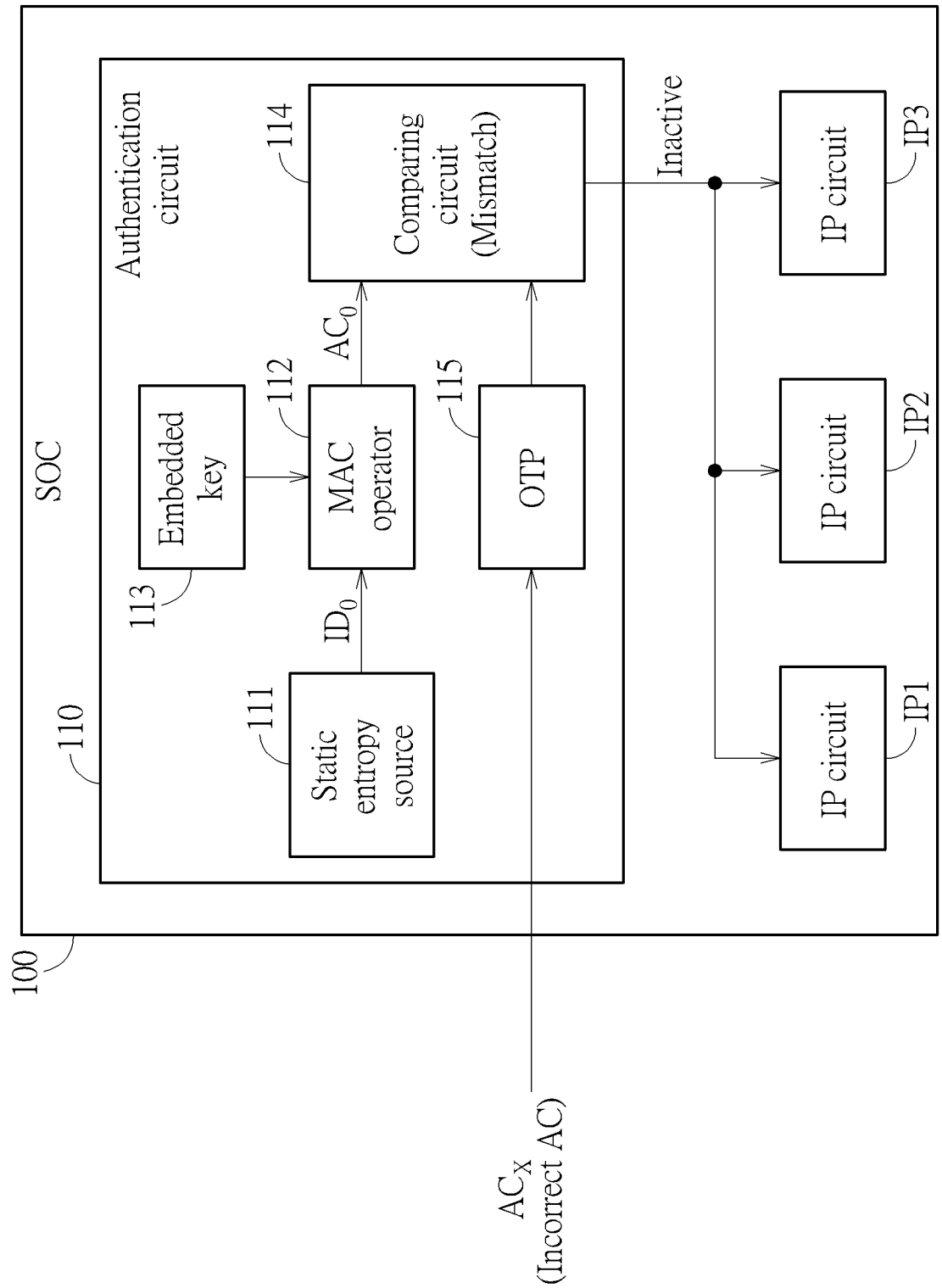
FIG. 2 is a diagram illustrating an electronic device without coupling to the activating device shown in FIG. 1 according to an embodiment of the present invention.

In one embodiment, the embedded key 113 may be a code stored in a read only memory (ROM), where this ROM is not connected to any output port of the electronic device, so the secret code is unable to be read from outside of the electronic device 100. In another embodiment, the embedded key 113 may be implemented by multiple bit-level units, where each of these bit-level units may be coupled to either a relative high voltage (which may correspond to a logic value "1") or a relative low voltage (which may correspond to a logic value "0") in order to represent a value of the embedded key 113. It should be noted that the ROM with the embedded key 113 is not connected to any output port of the SOC 100, so the embedded key 113 is unable to be read by devices outside the SOC 100. Thus, a design house (e.g., a provider of the SOC 100) may provide the server 50 (which comprise the secret key 53 that is identical to the embedded key 113) and the SOC 100 together to an authorized customer, to allow the authorized customer to utilize the server 50 to activate the SOC 100. By comparison, those without being authorized (e.g., those without the server 50) is unable to generate the correct activation code. As shown in FIG. 2, those without being authorized may input an incorrect activation code $AC_X$ (labeled "Incorrect AC" in FIG. 2 for better comprehension), and the comparison result may indicate that the activation code $AC_X$ is not identical to the reference code $AC_0$ (labeled "Mismatch" for better comprehension). Thus, the authentication circuit 110 may prevent activating the functional circuits IP1, IP2 and IP3 (e.g., controlling the states of the functional circuits IP1, IP2 and IP3 to be inactive) in response to the result of "Mismatch", thereby preventing overproduced devices (e.g., overproduced SOCs 100) from being utilized by unauthorized people.

In addition, the authentication circuit 110 may further comprise an one-time programmable (OTP) device 115 (labeled "OTP" in figures for brevity), where the OTP device 115 is coupled to the comparing circuit 114. In a first authentication procedure (e.g., an authentication procedure which is performed when the SOC 100 is booted or powered on first time), the SOC 100 receives the activation code $AC_1$ from outside (e.g., from the server 50), and the authentication circuit 110 writes the activation code $AC_1$ into the OTP device 115. The comparing circuit 114 may obtain the activation code $AC_1$ from the OTP device 115, and generate the comparison result (e.g., a first comparison result of the first authentication procedure) for determining whether to activate the functional circuits IP1, IP2 and IP3 in the first authentication procedure. In detail, as the OTP device 115 is one-time programmable, after the server 50 activates the SOC 100 first time and the activation code $AC_1$ is written into the OTP device 115, the OTP device 115 may act as a read only memory, and the functional circuits IP1, IP2 and IP3 do not need the server 50 for the activation afterwards. For example, in a second authentication procedure (e.g., an authentication procedure which is performed when the SOC 100 is booted or powered on next time), the comparing circuit 114 may obtain the activation code $AC_1$ (which is identical to the reference code $AC_0$) from the OTP device 115, in order to generate another comparison result (e.g., a second comparison result of the second authentication procedure) for determining whether to activate the functional circuits IP1, IP2 and IP3 according to the another comparison result. Thus, the functional circuits IP1, IP2 and IP3 can be accordingly activated without the server 50 in the second authentication procedure.

Figure 3:
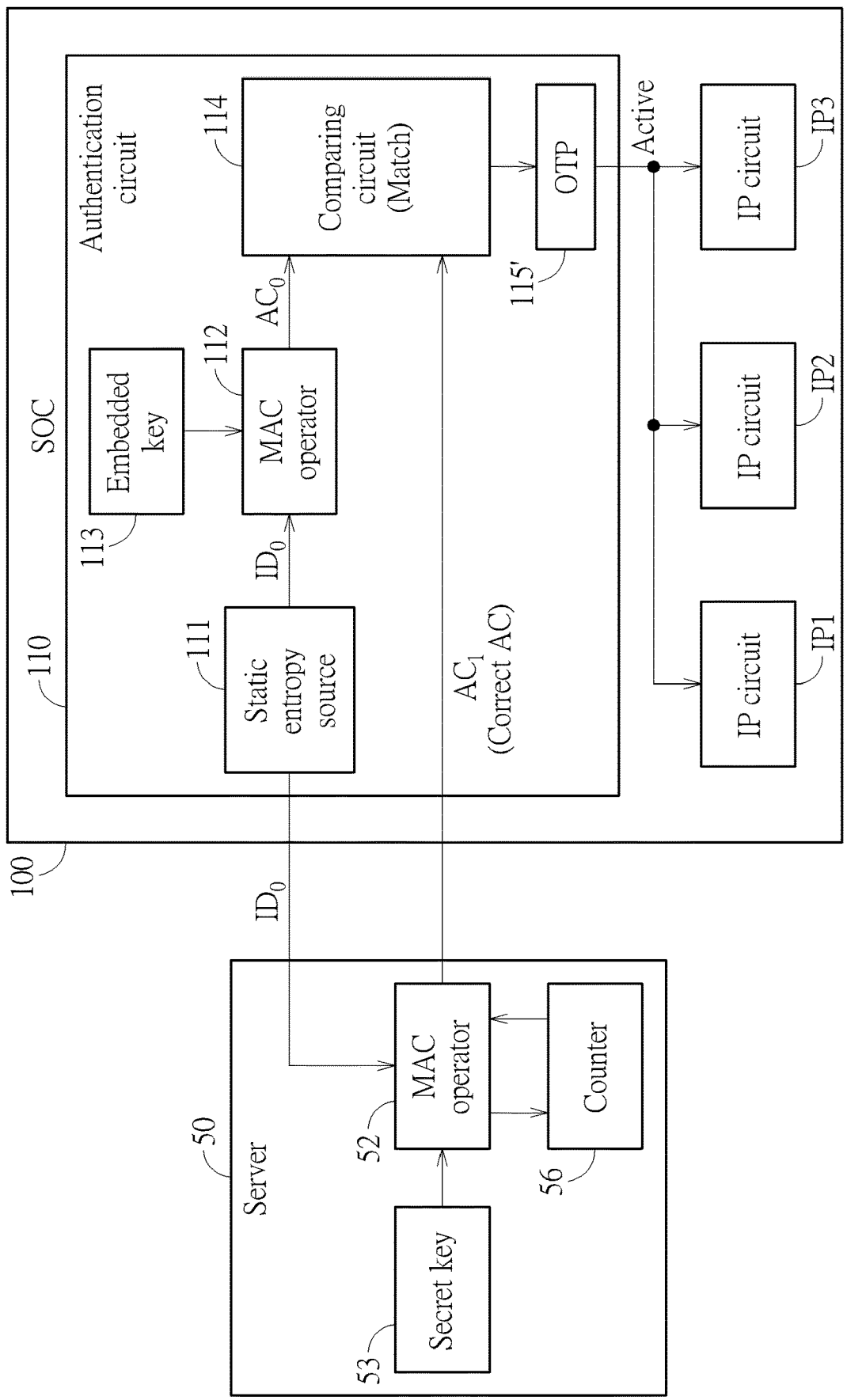
FIG. 3 is a diagram illustrating an electronic device coupled to an activating device according to another embodiment of the present invention.

In another embodiment, the activation code $AC_1$ from the server 50 may not need to be stored in the OTP device 115. In detail, the SOC 100 comprises an OTP device 115' coupled to the output of the comparing circuit 114 as shown in FIG. 3. The comparing circuit 114 may obtain the activation code $AC_1$ from outside (e.g., the server 50) when the SOC 100 is booted or powered on first time (e.g., during the first authentication procedure mentioned above), and the authentication circuit 110 may write the comparison result generated by the comparing circuit 114 into the OTP device 115', where the authentication circuit 110 may determine whether to activate the functional circuits IP1, IP2 and IP3 according to the comparison result stored in the OTP device 115'. Thus, after the server 50 activates the SOC 100 first time and the comparison result generated based on the correct activation code $AC_1$ is written into the OTP device 115', the OTP device 115' may act as a read only memory, and the functional circuits IP1, IP2 and IP3 do not need the server 50 for the activation afterwards. For example, the authentication circuit 110 may refer to the comparison result stored in the OTP device 115' when the SOC 100 is booted or powered on next time (e.g., during the second authentication procedure mentioned above), and the functional circuits IP1, IP2 and IP3 can be accordingly activated without the server 50.

Figure 4:
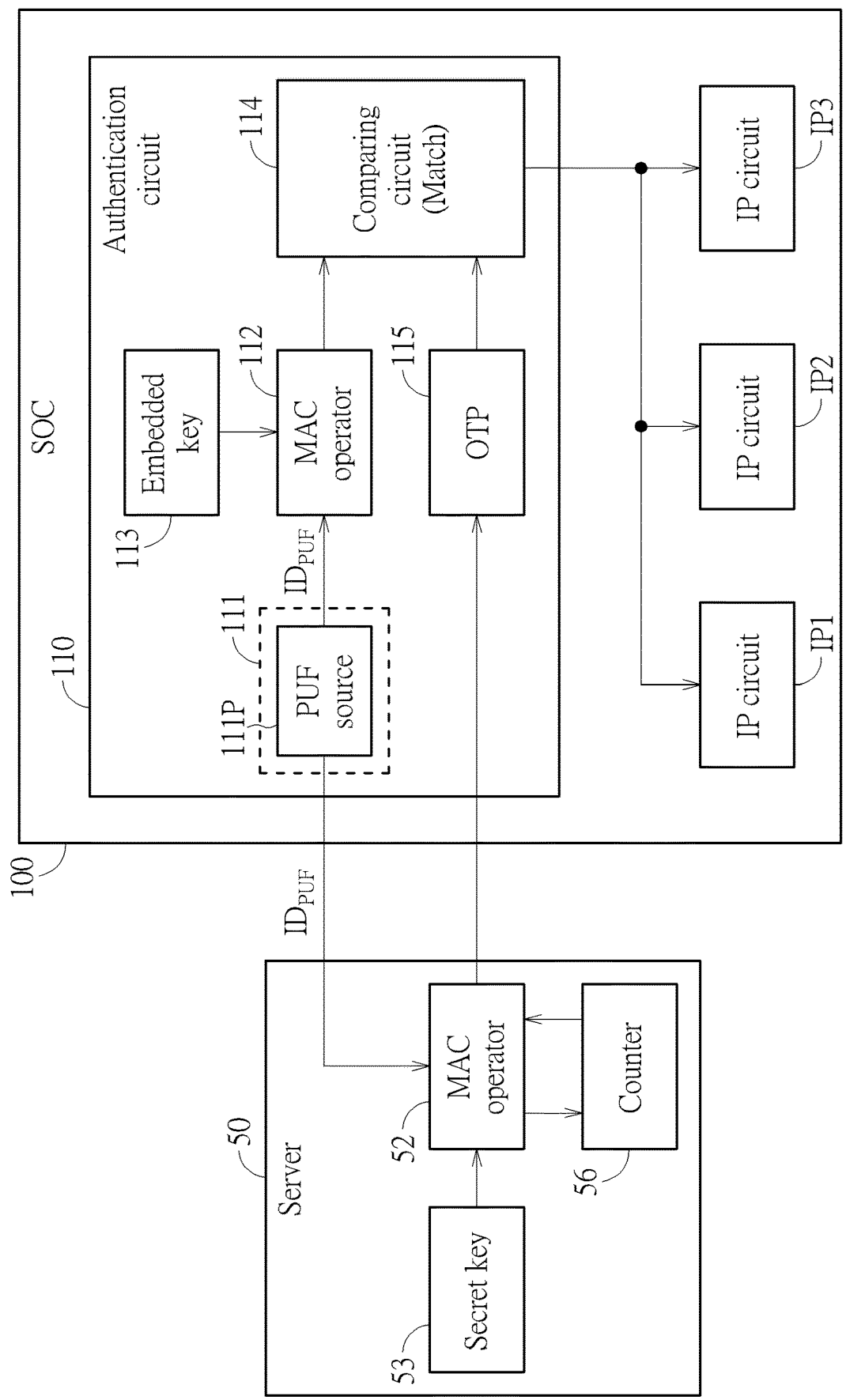
FIG. 4 is a diagram illustrating some details related to a static entropy source of the electronic device shown in FIG. 1 according to an embodiment of the present invention.
Figure 5:
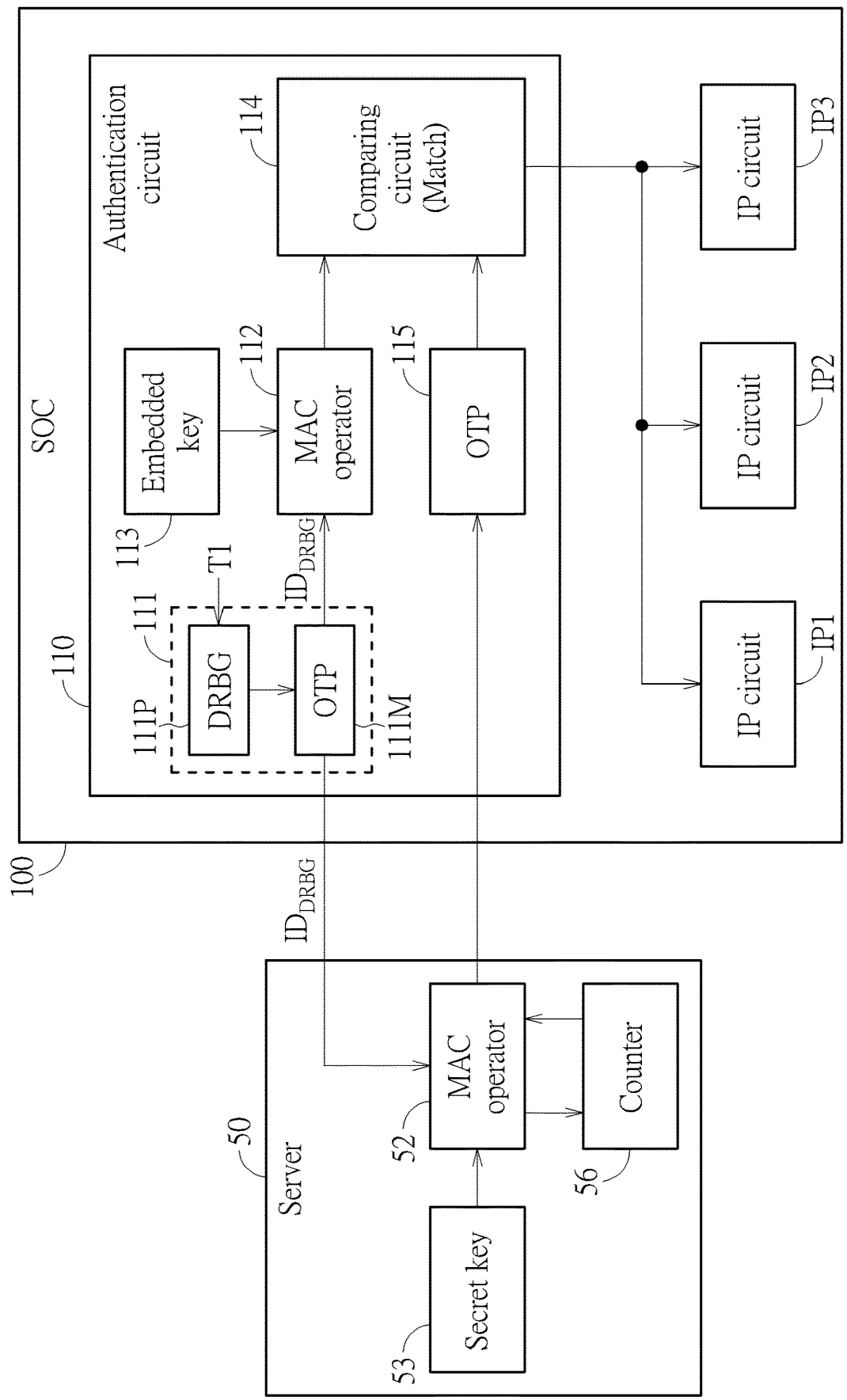
FIG. 5 is a diagram illustrating some details related to a static entropy source of the electronic device shown in FIG. 1 according to another embodiment of the present invention.

In one embodiment, the static entropy source 111 may comprise a Physical Unclonable Function (PUF) source 111P as shown in FIG. 4, and a static entropy $ID_{PUF}$ output from the PUF source 111 may be an example of the static entropy $ID_0$ shown in FIG. 1. As physical characteristics of different chips may be slightly different from each other due to some uncontrollable factors in the manufacturing process, these differences are unable to be copied or predicted, which may be reflected on the static entropy $ID_{PUF}$ output from the PUF source 111. In another embodiment, the static entropy source 111 may comprise a deterministic random bit generator (DRBG) 111R and an OTP device such as an OTP device 111M as shown in FIG. 5. The DRBG 111R comprises an input terminal T1. The DRBG 111R is configured to receive a random number from a dynamic entropy source by the input terminal T1 to generate a sequence of random bits, and the OTP device 111M is configured to store the sequence of random bits outputted from the DRBG 111R as a static entropy $ID_{DRBG}$. Once the sequence of random bits is written into the OTP device 111M, the static entropy $ID_{DRBG}$ is unchanged, and may be an example of the static entropy $ID_0$ shown in FIG. 1.

Figure 6:
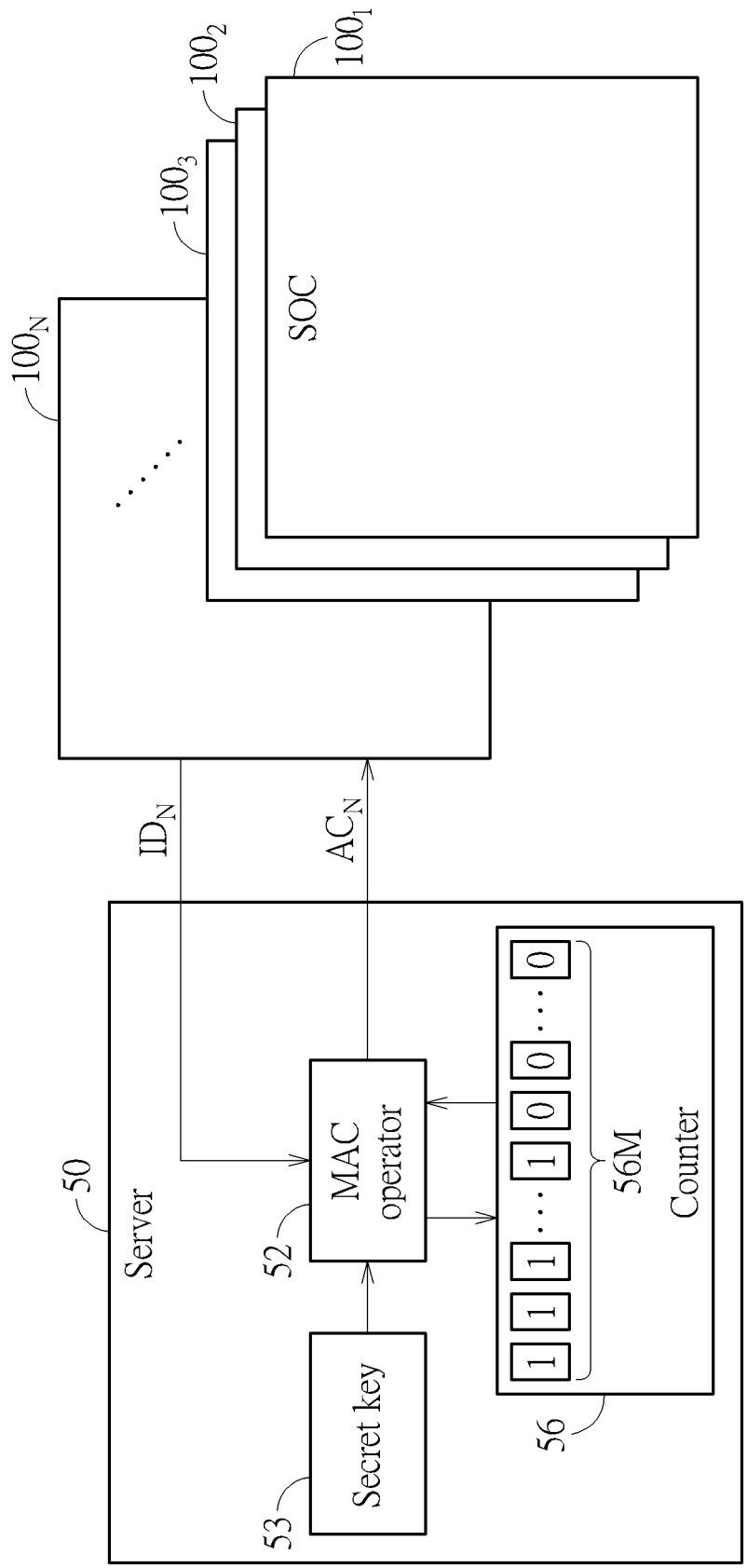
FIG. 6 is a diagram illustrating some details related to a counter of the electronic device shown in FIG. 1 according to an embodiment of the present invention.

FIG. 6 is a diagram illustrating the server 50 sequentially activating a plurality of electronic devices such as SOCs 100$_1$, 100$_2$, 100$_3$, . . . and 100$_N$ according to an embodiment of the present invention, where N represents a positive integer, and each of the SOCs 100$_1$, 100$_2$, 100$_3$, . . . and 100$_N$ may be an example of the SOC 100 shown in FIG. 1. As mentioned in the previous embodiment, only those who obtains/accesses the server 50 from a developer (e.g., an IC design house) of the SOC 100 are able to activate the SOC 100 (e.g., any of the SOCs 100$_1$, 100$_2$, 100$_3$, . . . and 100$_N$). For example, when people who is unauthorized by a developer (e.g., an IC design house) of the SOC 100 illegally obtains any SOC of the SOCs 100$_1$, 100$_2$, 100$_3$, . . . and 100$_N$, the unauthorized people is still unable to activate this SOC, since the unauthorized people do not obtain/access the server 50 (which contains the embedded key 113 therein) or any equipment with the server 50 built therein. Thus, it can be guaranteed that only the authorized people or vender (which legally obtains/access the server 50 or the equipment with the server 50 built therein from the developer of the SOC 100) is able to activate the SOC 100. In this embodiment, the server 50 can further control how many electronic devices are able to be activated with aid of the counter 56, in order to prevent overproduced electronic devices from being activated. Assume that the server 50 has activated (N−1) SOCs, and is going to activate an $N^{th}$ SOC (i.e., the SOC 100$_N$). The MAC operator 52 may determine whether to output an activation code $AC_N$ to the SOC 100$_N$ according to the counting result. For example, if the counting result has not reached a predetermined threshold $TH_{AC}$ yet, the MAC operator 52 may output the activation code $AC_N$ according to the static entropy $ID_N$ and the secret key 53 to the SOC 100$_N$. In another example, if the counting result reaches the predetermined threshold $TH_{AC}$, the MAC operator 52 may stop outputting the activation code (e.g., prevent outputting the activation code $AC_N$) according to the static entropy $ID_N$ and the secret key 53 to the SOC 100$_N$. Thus, the number of electronic devices being activated by the server 50 can be limited by the predetermined threshold $TH_{AC}$, thereby preventing the overproduced electronic devices from being activated.

In detail, the counter 56 may comprise a predetermined number of OTP elements 56M configured to record the counting result, where the predetermined number may correspond to the predetermined threshold $TH_{AC}$ (e.g., the predetermined number may be equal to the predetermined threshold $TH_{AC}$). The server 50 may write a specific logic value into one of the OTP elements 56M every time the MAC operator 52 generates one activation code. For example, the server 50 may write the logic value "1" into the first OTP element starting from the leftmost one among the OTP elements 56M as illustrated in FIG. 6 when the server 50 generates a first activation code for a first SOC such as the SOC 100$_1$; the server 50 may write the logic value "1" into the second OTP element starting from the leftmost one among the OTP elements 56M as illustrated in FIG. 6 when the server 50 generates a second activation code for a second SOC such as the SOC 100$_2$; the server 50 may write the logic value "1" into the third OTP element starting from the leftmost one among the OTP elements 56M as illustrated in FIG. 6 when the server 50 generates a third activation code for a third SOC such as the SOC 100$_3$; and the rest may be deduced by analogy, where any OTP element of the OTP elements 56M that has not been written with the logic value "1" therein is labeled "0" in FIG. 6 for better comprehension. When the MAC operator 52 generates the activation code $AC_N$ according to the static entropy $ID_N$ from the SOC 100$_N$ and the secret key 53, the server 50 may refer the counter 56 to determine whether all of the OTP elements 56M have stored the specific logic value (e.g., the logic value "1"). For example, when the counting result indicates that at least one OTP element of the OTP elements 56M is not written with the logic value "1" therein, the server 50 (e.g., the counter 56) may allow the MAC operator 52 to normally output the activation code $AC_N$ to activate the SOC 100$_N$. In another example, when the counting result indicates that all of the OTP elements 56M have stored the logic value "1", the MAC operator 52 may stop outputting the activation code according to the static entropy $ID_N$ and the secret key 53 to the electronic device coupled to the server 50, and more particularly, the server 50 may prevent the MAC operator 52 from outputting the activation code $AC_N$ to the SOC 100$_N$. Thus, after all of the OTP elements 56M have stored the logic value "1", the server 50 may regard any electronic device coupled to the server 50 as an overproduced electronic device, and may prevent activating this electronic device.

Figure 7:
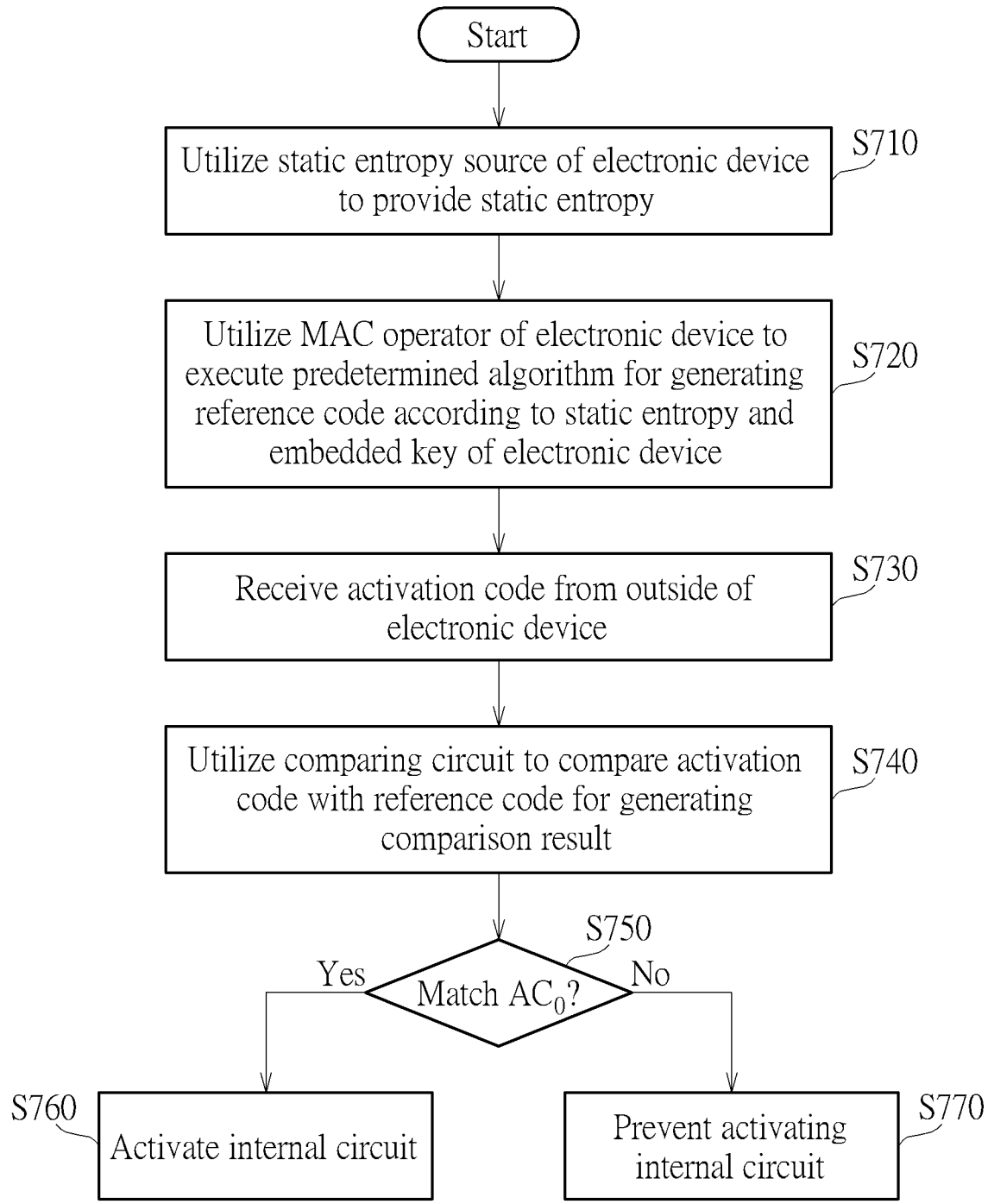
FIG. 7 is a diagram illustrating a working flow of a method for controlling device activation according to an embodiment of the present invention.

FIG. 7 is a diagram illustrating a working flow of a method for controlling device activation according to an embodiment of the present invention, where the working flow is applicable to an electronic device such as the SOC 100 shown in FIG. 1. It should be noted that one or more steps may be added, deleted or modified in the working flow shown in FIG. 7, and these steps do not have to be executed in the exact order shown in FIG. 7 if an overall result is not hindered.

In Step S710, the electronic device (e.g., the SOC 100 shown in FIG. 1) may utilize a static entropy source (e.g., the static entropy source 111) of the electronic device to provide a static entropy (e.g., the static entropy $ID_0$).

In Step S720, the electronic device may utilize a first message authentication code (MAC) operator (e.g., the MAC operator 112) of the electronic device to execute a predetermined algorithm for generating a reference code (e.g., the reference code $AC_0$ shown in FIG. 1) according to the static entropy and an embedded key (e.g., the embedded key 113) of the electronic device.

In Step S730, the electronic device may receive an activation code from outside of the electronic device (e.g., the correct activation code from the server 50 or the incorrect activation code $AC_X$ from other devices).

In Step 740, the electronic device may utilize a comparing circuit (e.g., the comparing circuit 114 shown in FIG. 1) to compare the activation code with the reference code for generating a comparison result.

In Step S750, the electronic device may determine whether to activate at least one internal circuit (e.g., the functional circuits IP1, IP2 and IP3) of the electronic device according to the comparison result. If the comparison result indicates that the activation code matches the reference code (e.g., $AC_1$ is identical to $AC_0$), the working flow proceeds with Step S760; and if the comparison result indicates that the activation code does not match the reference code (e.g., $AC_X$ is not identical to $AC_0$), the working flow proceeds with Step S770.

In Step S760, the electronic device may activate the at least one internal circuit.

In Step S770, the electronic device may prevent activating the at least one internal circuit.

Figure 8:
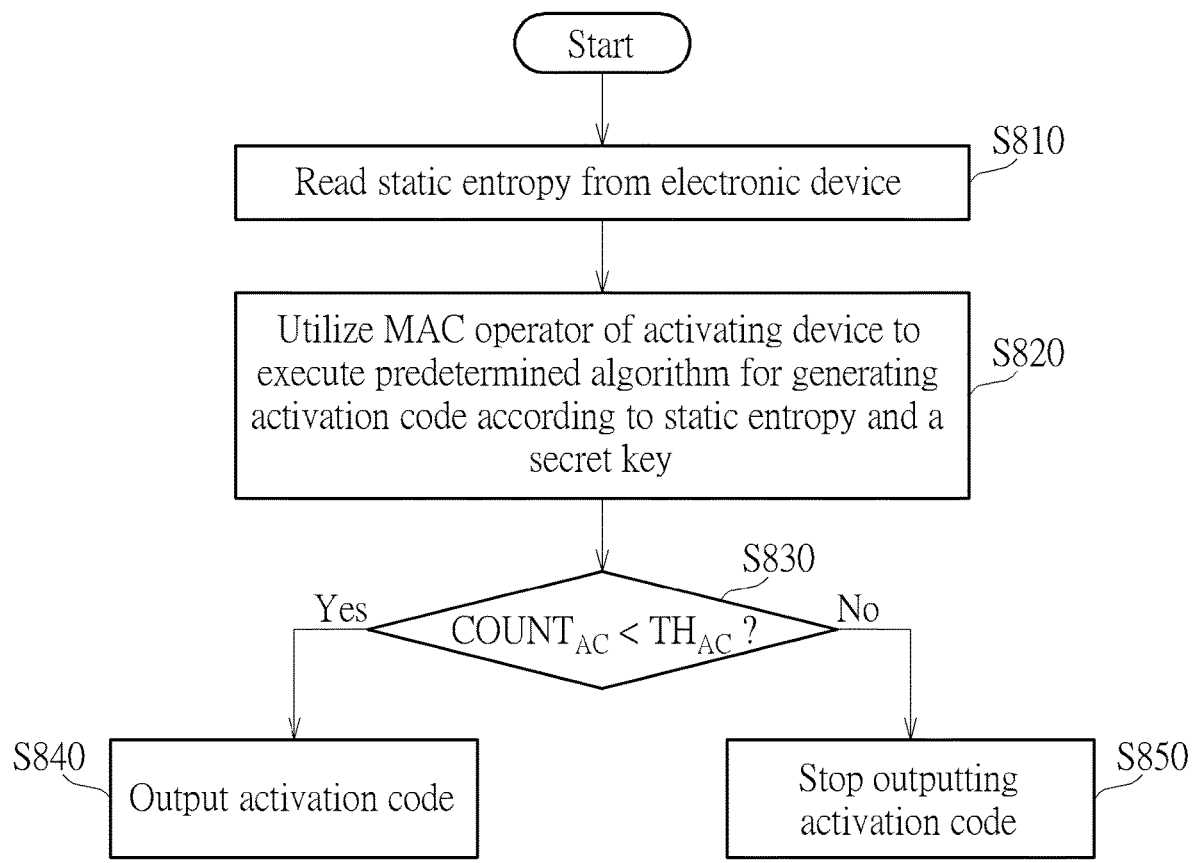
FIG. 8 is a diagram illustrating a working flow of an activating device for activating electronic devices according to an embodiment of the present invention.

FIG. 8 is a diagram illustrating a working flow of an activating device (e.g., the server 50 shown in FIG. 6) for activating electronic devices (e.g., the SOCs $100_1$, $100_2$, $100_3$, . . . and $100_N$) according to an embodiment of the present invention. It should be noted that one or more steps may be added, deleted or modified in the working flow shown in FIG. 8, and these steps do not have to be executed in the exact order shown in FIG. 8 if an overall result is not hindered.

In Step 810, the activating device (e.g., the server 50 shown in FIG. 6) may read a static entropy from an electronic device (e.g., $ID_N$ from the SOC $100_N$).

In Step S820, the activating device may utilize a MAC operator (e.g., the MAC operator 52 shown in FIG. 1) of the activating device to execute a predetermined algorithm (e.g., the same algorithm as that executed by the MAC operator 112 of the SOC $100_N$) for generating an activation code (e.g., the activation code $AC_N$ shown in FIG. 6) according to the static entropy and a secret key (e.g., the secret key 53 shown in FIG. 6).

In Step 830, the activating device may refer to a counting result $COUNT_{AC}$ recorded by a counter (e.g., the counter 56 shown in FIG. 6), in order to determine whether to allow the MAC operator to output the activation code to the electronic device. If the counting result does not reach a predetermined threshold (e.g., the determination of "$COUNT_{AC}<TH_{AC}$" is "Yes"), the flow proceeds with Step S840; and if the counting result reaches the predetermined threshold (e.g., the determination of "$COUNT_{AC}<TH_{AC}$" is "No"), the flow proceeds with Step S850.

In Step S840, the activating device may allow the MAC operator to output the activation code.

In Step S850, the activating device may prevent the MAC operator from outputting the activation code.

To summarize, the embodiments of the present invention can properly control the device activation of an electronic device (e.g., the SOC 100) with aid of an activating device (e.g., the server 50). In the embodiment of the present invention, only those having the activating device are able to activate the electronic device, and the number of electronic devices being activated is also under control of the method of the present invention. Thus, the present invention can ensure that only authorized customers (e.g. one having the activating device which has the correct value of an embedded key within the electronic device) are able to activate the electronic device, and the problem related to the overproduced electronic devices can be avoided. In addition, the embodiment of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling device activation, comprising:
utilizing a static entropy source of an electronic device to provide a static entropy;
utilizing a first message authentication code (MAC) operator of the electronic device to execute a predetermined algorithm for generating a reference code according to the static entropy and an embedded key of the electronic device;
receiving an activation code from outside of the electronic device;
utilizing a comparing circuit to compare the activation code with the reference code for generating a comparison result; and
determining whether to activate at least one functional circuit of the electronic device according to the comparison result;
wherein the activation code is received in a first authentication procedure and the comparison result is generated for determining whether to activate the at least one functional circuit in the first authentication procedure, and the method further comprises:
writing the activation code into an one-time programmable (OTP) device of the electronic device in the first authentication procedure;
utilizing the comparing circuit to obtain the activation code from the OTP device in a second authentication procedure after determining whether to activate the at least one functional circuit in the first authentication procedure;
utilizing the comparing circuit to compare the activation code from the OTP device with the reference code for generating another comparison result in the second authentication procedure; and
determining whether to activate the at least one functional circuit according to the another comparison result in the second authentication procedure.

2. The method of claim 1, wherein when the comparison result indicates that the activation code is identical to the reference code, the at least one functional circuit is activated.

3. The method of claim 1, wherein the static entropy source comprises a Physical Unclonable Function (PUF) source.

4. The method of claim 1, wherein utilizing the static entropy source of the electronic device to provide the static entropy comprises:
utilizing a deterministic random bit generator (DRBG) to generate a sequence of random bits; and
utilizing another OTP device to store the sequence of random bits as the static entropy.

5. The method of claim 1, wherein the electronic device is coupled to an activating device, and the method further comprises:
utilizing the activating device to receive the static entropy from the electronic device;
utilizing a second MAC operator of the activating device to execute the predetermined algorithm for generating the activation code according to the static entropy and a secret key;
wherein when the secret key is identical to the embedded key of the electronic device, the comparison result indicates that the activation code is identical to the reference code, and the at least one functional circuit is activated.

6. The method of claim 5, further comprising:
utilizing a counter to generate a counting result for indicating how many activation codes have been generated by the second MAC operator.

7. The method of claim 6, wherein when the counting result reaches a predetermined threshold, the second MAC operator stops outputting the activation code to the electronic device according to the secret key and the static entropy.

8. The method of claim 7, wherein utilizing the counter to generate the counting result for indicating how many times the second MAC operator generates the activation code comprises:
writing a specific logic value into one of a predetermined number of one-time programmable (OTP) elements within the counter every time the second MAC operator generates one of the activation codes, wherein the predetermined number corresponds to the predetermined threshold, and when all of the OTP elements have stored the specific logic value, the second MAC operator stops outputting the activation code to the electronic device according to the secret key and the static entropy.

9. An electronic device, comprising:
at least one functional circuit, configured to execute at least one predetermined function;
an authentication circuit, coupled to the at least one functional circuit, configured to control activation of the at least one functional circuit, wherein the authentication circuit comprises:
a static entropy source, configured to provide a static entropy;
a first message authentication code (MAC) operator, coupled to the static entropy source, configured to execute a predetermined algorithm for generating a reference code according to the static entropy and an embedded key of the electronic device; and
a comparing circuit, coupled to the first MAC operator, configured to compare an activation code from outside of the electronic device with the reference code for generating a comparison result;
wherein the authentication circuit determines whether to activate the at least one functional circuit according to the comparison result, the activation code is received in a first authentication procedure and the comparison result is generated for determining whether to activate the at least one functional circuit in the first authentication procedure, and the authentication circuit further comprises:
an one-time programmable (OTP) device, coupled to the comparing circuit;
wherein the authentication circuit writes the activation code into the OTP device in the first authentication procedure, and the comparing circuit obtains the activation code from the OTP device in a second authentication procedure after determining whether to activate the at least one functional circuit in the first authentication procedure, and the comparing circuit compares the activation code from the OTP device with the reference code for generating another comparison result, and the authentication circuit determines whether to activate the at least one functional circuit according to the another comparison result in the second authentication procedure.

10. The electronic device of claim 9, wherein when the comparison result indicates that the activation code is identical to the reference code, the authentication circuit activates the at least one functional circuit.

11. The electronic device of claim 9, wherein the static entropy source comprises a Physical Unclonable Function (PUF) source.

12. The electronic device of claim 9, wherein the static entropy source comprises:
a deterministic random bit generator (DRBG), configured to generate a sequence of random bits; and
another OTP device, configured to store the sequence of random bits as the static entropy.

13. The electronic device of claim 9, wherein the electronic device is coupled to an activating device, and the activating device comprises:
a second MAC operator, configured to execute the predetermined algorithm for generating the activation code according to the static entropy read from the static entropy source of the electronic device and a secret key;
wherein when the secret key is identical to the embedded key of the electronic device, the comparison result indicates that the activation code is identical to the reference code, and the authentication circuit activates the at least one functional circuit.

14. The electronic device of claim 13, wherein the activating device further comprises:
a counter, coupled to the second MAC operator, configured to generate a counting result for indicating how many activation codes have been generated by the second MAC operator.

15. The electronic device of claim 14, wherein when the counting result reaches a predetermined threshold, the second MAC operator stops outputting the activation code to the electronic device according to the secret key and the static entropy.

16. The electronic device of claim 15, wherein the counter comprises:
a predetermined number of one-time programmable (OTP) elements, configured to record the counting result, wherein the predetermined number corresponds to the predetermined threshold;

wherein the activating device writes a specific logic value into one of the OTP elements every time the second MAC operator generates one of the activation codes, and when all of the OTP elements have stored the specific logic value, the second MAC operator stops outputting the activation code to the electronic device according to the secret key and the static entropy.

* * * * *